United States Patent Office 3,306,700
Patented Feb. 28, 1967

3,306,700
METHOD OF LITHIUM RECOVERY
Marshall P. Neipert and Charles K. Bon, Midland, Mich., assignors to The Dow Chemical Company, Midland, Mich., a corporation of Delaware
No Drawing. Filed Mar. 6, 1964, Ser. No. 350,123
7 Claims. (Cl. 23—25)

This invention relates to an improved method for recovery of lithium values, and more particularly, to an improved method for the recovery of lithium from aqueous solutions containing lithium values by precipitation of the lithium as an easily filterable, large particle sized, granulated lithium aluminate complex.

U.S. Patent No. 2,964,381 entitled, "Recovery of Lithium," issued to R. D. Goodenough on December 13, 1960, describes a process for the recovery of lithium from aqueous solutions containing alkaline earth metal salts by intermixing an aluminum compound, either freshly precipitated aluminum hydroxide in the bayerite form or soluble aluminum salts, with said solution thereby precipitating lithium as a lithium aluminate complex. The process as set forth by Goodenough has certain disadvantages which present problems in commercial operation. The product produced by the patented process is a voluminous, gelatinous precipitate which is only about 10 percent by weight solids, has an average particle size of only about 1 micron, and is filterable at a detrimentally slow rate of less than about 0.1 gallon per minute per square foot of filter area (gal./min./ft.$^2$). Thus, a process for ready recovery of lithium values from brines in the form of an easily filterable granulated relatively large particle sized lithium aluminum complex is an existing need.

We have unexpectedly discovered an improved process for the recovery of lithium from aqueous salt solutions which produces a lithium aluminate complex precipitate which is granular in form, has a particle size ranging from about 3 to about 30 microns, has a minimum filtering rate of at least about 0.5 to 4 gal./min./ft.$^2$ and contains about 15 or more percent by weight solids.

It is a principal object of the instant invention to provide an improved economical process for recovery of lithium from aqueous solution containing at least one lithium salt.

It is a further object to provide an improved process for recovery of lithium which produces a granular large particle sized, easily filterable lithium aluminate complex precipitate.

An additional object is to provide an improved process by which substantially all lithium can be economically recovered by precipitating a lithium aluminate complex from an aqueous salt solution containing relatively small amounts of lithium salts without concomitantly precipitating substantial quantities of other salts, including alkaline earth metal salts from said salt solution.

Other objects and advantages of the instant invention will become apparent from reading the detailed description thereof disclosed hereinafter.

In general, the process of the present invention for the recovery of lithium values from an aqueous solution containing at least two salts, one of which being a lithium salt, is comprised of treating and agitating the aqueous solution in a reactor with hydrated aluminum oxide (aluminum hydroxide), reacting the aluminum compound with the lithium present in the solution, the resulting reaction mixture having a pH value within the range of from about 4.5 to about 5.4 and preferably about 5.25 and precipitating in readily filterable form a major portion of the lithium values present in said solution as a particulate lithium aluminate complex. Vigorous agitation of the mixture is continued at a rate such that the particles of precipitate are not allowed to settle to the bottom of the reactor. However, the degree of agitation is not so great as to break up the precipitate as it forms.

In the actual operation of the present improved process, ordinarily a slurry of the precipitate and brine is recirculated in the reactor while intermixing of brine, hydrated aluminum oxide and the lithium alminate complex precipitate continues. In this manner, the product precipitate is formed directly as large, easily filterable granules. When the slurry of the continuously recirculated precipitate attains a filtering rate of at least about 0.5 gal./min./ft.$^2$, it is removed from the reactor. Thus, it is seen that the precipitation is allowed to be carried out using the original precipitate as nuclei. The large particles are constantly removed, and the smaller ones are recirculated and allowed to grow.

Substantially all of the lithium in a solution containing as little as 0.01 weight percent of a lithium salt and which can contain other soluble salt compounds such as salts of calcium, magnesium, sodium, potassium, strontium and others can readily be recovered by the instant process. As set forth hereinbefore, the lithium values, as recovered are of a high purity, i.e., the other soluble salts, if present, do not precipitate with the lithium aluminate complex product in detrimental amounts.

The alkalinity required for the precipitation of lithium aluminate complex depends upon the particular lithium solution used and the concentration of salts other than lithium in the solution. Generally, a lower alkalinity is required for the more concentrated solutions. Thus, the required alkalinity for any particular solution employed in the present novel process easily is determined. To illustrate, for relatively concentrated chloride solutions, e.g., brines having a total salt concentration of about 350 g./l. from which magnesium compounds have not been removed, an apparent pH in the range of 4.5 to 5.4 is used which, when based upon acid titration, requires from about 4 to about 8 ml. of 0.1 N HCl to neutralize the soluble alkalinity in a 100 ml. sample. An alkalinity of about a pH of 5.25 or from about 5 to about 7 ml. of 0.1 N HCl to neutralize the soluble alkalinity in a 100 ml. sample using methyl read as an indicator is preferred.

The temperature required likewise will depend somewhat upon the type of lithium containing solution used and the concentration of the solute materials in the solution. The temperature of the operation not only effects the total amount of lithium precipitated, but also determines to some extent the amount of the other compounds which will coprecipitate from the solution. Precipitation runs made from the same solutions and under identical conditions except for the temperature, have shown differences in the resulting alkalinity of the mother liquor. This apparently is attributed to the reaction and precipitation of some of the soluble impurities, especially magnesium. The lithium aluminate product is precipitated from relatively concentrated chloride solutions at a temperature from about 45 to about 100° C., preferably from about 55 to about 75° C.

The term "apparent pH," as used herein, means the pH of the solution as determined by use of a conventional pH meter.

The hydrated aluminum oxide used herein can be formed directly on the feed-stock solution or can be freshly prepared and added to the lithium-containing solution. Thus, for example, aluminum chloride and sodium hydroxide can be admixed directly with the lithium-containing solution. Freshly prepared hydrated aluminum oxide (aluminum hydroxide) made, for example, by independently reacting sodium aluminate and aluminum chloride or by independently reacting sodium aluminate and hydrochloric acid, can be admixed with the lithium-containing solution.

The aluminum compounds which may be employed in addition to freshly precipitated aluminum hydroxide are soluble aluminum salts. Soluble aluminum salts which will not cause the precipitation of the alkaline earth metals at the temperature and the apparent pH at which the lithium aluminate complex is precipitated are preferred. These preferred aluminum salts include soluble acidic salts, such as aluminum chloride, aluminum nitrate, aluminum acetate, etc., or alkaline salts such as sodium aluminate, etc. When aluminum hydroxide or alkaline aluminate salts are used, the lithium solution must be sufficiently acidic so that the soluble alkalinity of the resulting mixture will not exceed the alkalinity necessary for the precipitation of the complex. Aluminum salts of anions which will precipitate the alkaline earth metals such as aluminum sulfate, etc., may be used for aqueous lithium solutions having relatively small amounts of lithium. However, when these salts are used, the alkaline earth metal precipitate formed by the addition of these salts to the lithium solution is generally removed prior to the precipitation of the lithium aluminate complex, and the separation of the lithium aluminate complex accomplished in the herein-described manner.

By controlling the alkalinity and the temperature as set forth hereinbefore, the lithium from the solution will combine with the aluminum hydroxide to form the complex. It is preferred to precipitate the aluminum hydroxide in the solution instead of adding the hydroxide since under the presently disclosed process conditions, the complex forms as soon as the aluminum hydroxide is precipitated. An advantage of the present novel process is that the critical operable conditions of temperature and alkalinity for the precipitation of the particularly readily filterable aluminate complex prepared in accordance with the present invention, are the same whether the aluminum hydroxide is added to the solution or formed in situ.

In the actual precipitation of the lithium aluminate complex, the aluminum compound is added to the solution in amounts so that the ratio of Al to Li in the solution is at least 2.5 and preferably about 3. A more complete recovery of the lithium is obtained with the excess of the aluminum compound, especially in solutions which contain a high concentration of other soluble salts. When the aluminum salt is added to the solution, the alkalinity must be below the given range and then the alkalinity of the solution adjusted by approaching from the acid side. To obtain the desired alkalinity, a predetermined amount of a strongly alkaline soluble aluminate, such as sodium aluminate, or a strong soluble hydroxide, such as sodium hydroxide, potassium hydroxide and ammonium hydroxide, may be added to the aluminum-containing solution. Calcium hydroxide may also be used. It is preferred to use a relatively dilute solution of the particular hydroxide or aluminate and to add either to the solution with vigorous agitation to insure intimate mixing and to prevent high alkalinity in localized parts of the solution. If the apparent alkalinity of the solution is above the desired range, the magnesium and the other alkaline earth metals displace the lithium from the aluminate complex and also the magnesium precipitates as magnesium hydroxide. Once these precipitates are formed, the lithium will not displace the metals in the aluminate complex nor will the magnesium hydroxide rapidly go back into solution when the alkalinity of the solution is corrected.

Many of the feed stock solutions ordinarily employed, such as natural brines, which contain small amounts of lithium, contain large amounts of magnesium compounds. If desired, these magnesium compounds can be removed prior to precipitation of the lithium. When the magnesium compounds are substantially removed, the temperature and the alkalinity of the solution, while critical, do not have to be closely controlled. The magnesium compounds can be removed by adding a strong hydroxide, such as sodium hydroxide, potassium hydroxide and calcium hydroxide, to the aqueous solution to precipitate the magnesium compounds as magnesium hyroxide. Generally, the amount of the hydroxide used is slightly in excess of the stoichiometric amount required to react with the magnesium compounds present. The precipitated magnesium hydroxide is removed from the remainder of the solution by any of a variety of methods, such as for example, filtration, centrifugation, and the like. After the magnesium hydroxide is removed, a soluble aluminum salt or freshly precipitated hydrated aluminum oxide can be added to the substantially magnesium-free solution and the lithium precipitated in the manner described hereinbefore. Ordinarily, with such solution, the alkalinity of the solution required to precipitate the lithium aluminate complex will differ from that required when the magnesium compounds have not been removed.

Reactors which can be utilized in the instant process include, for example, reactor vessels containing mixing apparatus which provide for exterior or interior recirculation of its contents. The Accelator® reactor, the Rota-Rake® reactor and the Reactivator® reactor are illustrative reactor-mixers which have been found suitable for use in the present process.

The following example further illustrates the invention but is in no way meant to limit it thereto.

EXAMPLE

*Run A*

A lithium-containing brine was used herein and had the following percent by weight analysis:

About 0.03 percent LiCl
About 17.6 percent $CaCl_2$
About 3.14 percent $MgCl_2$
About 5.56 percent NaCl
About 1.37 percent KCl
About 0.5 percent $SrCl_2$
Balance of water.

A six-foot diameter Accelerator® reactor was used as the reactor.

The lithium-containing brine was introduced into the reactor at a flow rate of 8 gal./min. About 0.0011 pound mole of aluminum per minute as aluminum chloride and about 0.0017 pound mole of aluminum per minute as sodium aluminate were reacted to form hydrated aluminum oxide. The hydrated aluminum oxide was then added to the reactor. Thus, about 4.7 moles of aluminum were present per mole of lithium in the brine. The mixture was heated and maintained at a temperature of about 74° C. and a pH value of about 5.25 to bring about a precipitation of a lithium aluminate complex. The mixture was vigorously agitated in the reactor during the entire procedure by an impeller revolving at a rate of 20 r.p.m. As the precipitate formed, small particles thereof were recirculated in the reactor and were periodically sampled for its filterability. When the filter rate of the wet precipitate reached about 2.6 gal./min./ft.² the precipitate was removed from the reactor. Inventory time in the reactor for the removed precipitate was about 20 hours and for the brine continuously leaving the reactor was about 2.83 hours. The precipitate was then filtered. About 2.90 pounds of wet filter cake per gallon of total solution used was obtained. The wet filter cake was then dried by heating said cake up to about 120° C. for about 12 hours. It was found that about 1.08 pounds of dry cake was removed per minute per square foot of filter area.

About 96 percent of the lithium values in the starting brine was recovered in the lithium aluminate complex precipitate. The precipitate recovered by the instant improved method was an easily filterable, granulated precipitate having an average particle size of about 21 microns,

Control

In a controlled study, the same procedure as described in Run A was carried out using the same relative proportions of ingredients except that a one foot diameter Accelerator® was used. The significant difference in this controlled study from Run A was that the lithium aluminate precipitate was not recirculated in the reactor as it formed. The precipitate was allowed to settle to the bottom of the reactor and then was recovered.

The wet precipitate was voluminous and gelatinous in nature, had a filter rate of about 0.17 gal./min./ft.$^2$ and an average particle size of about 1 micron. It was found that about 0.0022 pound of dry cake was removed per square foot of filter area.

About 74.8 percent of the lithium values in the starting brine were recovered in the gelatinous lithium aluminate complex.

In comparing the precipitates obtained using the instant improved method in Run A and the Control, it is seen that the instant improved method produces a larger sized, more easily filterable precipitate.

In a manner similar to the procedure described in the foregoing example, the hydrated aluminum oxide can be formed in situ by admixing sodium hydroxide, aluminum chloride and said brine in the reactor, or can be independently prepared by reacting sodium aluminate and hydrochloric acid and then adding the hydrated aluminum oxide formed to the brine in said reactor, thereby producing a large particle sized, granulated, easily filterable lithium aluminate complex precipitate comparable to that described in the example.

Various modifications can be made in the instant invention without departing from the spirit or scope thereof for it is to be understood that we limit ourselves only as defined in the appended claims.

What is claimed is:

1. In a process for the recovery of lithium values from an aqueous brine solution containing dissolved lithium values, by treating said solution with a hydrated aluminum oxide thereby to precipitate a lithium aluminate complex the improvement which comprises:
    (a) treating and agitating said aqueous brine solution containing said lithium values in a reactor with a hydrated aluminum oxide to react with the lithium present in the resulting reaction mixture, said solution having a pH value in the range of from about 4.5 to about 5.4 and a temperature in the range of from about 45° C. to about 100° C. thereby to precipitate as a lithium aluminate complex a major portion of the lithium values present in said solution without concomitantly precipitating substantial quantities of other salts present in said solution;
    (b) recirculating the resulting aqueous slurry of said lithium aluminate complex precipitate in said brine in the reactor;
    (c) continuing to recirculate said lithium aluminate precipitate slurry while intermixing and agitating said slurry with additional quantities of said brine and hydrated aluminum oxide to provide a final product slurry having said lithium aluminate complex precipitate in granular form, said final product slurry having a filtering rate of at least 0.5 gallon per minute per square foot or filter area; and
    (d) removing said precipitate of lithium aluminate complex from said final product slurry.

2. The process in accordance with claim 1 wherein said hydrated aluminum oxide is independently prepared by reacting sodium aluminate and aluminum chloride.

3. The process in accordance with claim 1 wherein said hydrated aluminum oxide is independently prepared by reacting sodium aluminate with hydrochloric acid and admixing the precipitate thereby formed with the lithium-containing brine.

4. The process in accordance with claim 1 wherein said hydrated aluminum oxide is prepared by admixing aluminum chloride and sodium hydroxide with the lithium-containing brine.

5. The process in accordance with claim 1 wherein said granular precipitate of lithium aluminate complex has a particile size within the range of from about 3 to about 30 microns.

6. The process in accordance with claim 1 wherein the mole ratio of aluminum to lithium in the reaction mixture is at least 2.5.

7. The process in accordance with claim 1 wherein the pH of said reaction mixture is at a value of about 5.25.

References Cited by the Examiner
UNITED STATES PATENTS

| | | | |
|---|---|---|---|
| 1,931,374 | 10/1933 | Clark et al. | 23—52 |
| 2,964,381 | 12/1960 | Goodenough | 23—25 |

OSCAR R. VERTIZ, *Primary Examiner.*

G. L. OZAKI, *Assistant Examiner.*

UNITED STATES PATENT OFFICE
CERTIFICATE OF CORRECTION

Patent No. 3,306,700

February 28, 1967

Marshall P. Neipert et al.

It is hereby certified that error appears in the above numbered patent requiring correction and that the said Letters Patent should read as corrected below.

Column 4, line 3, for "hyroxide" read -- hydroxide --; column 5, line 45, before "resulting" insert -- solution, the --; same column 5, lines 45 and 46, for "mixture, said solution" read -- mixture --; column 6, line 16, for "foot or" read -- foot of --; line 33, for "particile" read -- particle --.

Signed and sealed this 7th day of November 1967.

(SEAL)
Attest:

Edward M. Fletcher, Jr.
Attesting Officer

EDWARD J. BRENNER
Commissioner of Patents